United States Patent

Davis

Patent Number: 5,904,740
Date of Patent: May 18, 1999

[54] FUEL FOR LIQUID FEED FUEL CELLS

[75] Inventor: James Lynn Davis, Parkland, Fla.

[73] Assignee: Motorola, Inc., Schaumburg, Ill.

[21] Appl. No.: 08/868,329

[22] Filed: Jun. 3, 1997

[51] Int. Cl.$^6$ .................................. C10L 1/02; C10L 1/32
[52] U.S. Cl. .................. 44/385; 44/302; 44/403; 44/451; 44/452
[58] Field of Search .............. 44/385, 403, 302, 44/452, 451

[56] References Cited

U.S. PATENT DOCUMENTS

| | | | |
|---|---|---|---|
| 3,013,908 | 12/1961 | Luck . | |
| 3,113,049 | 12/1963 | Worsham | 136/86 |
| 3,983,010 | 9/1976 | Rauch et al. | 203/15 |
| 4,126,716 | 11/1978 | Yamamoto et al. | 427/15 |
| 4,262,063 | 4/1981 | Kudo et al. | 429/41 |
| 4,299,981 | 11/1981 | Leonard | 203/77 |
| 4,390,603 | 6/1983 | Kawana et al. | 429/30 |
| 4,478,917 | 10/1984 | Fujita et al. | 429/33 |
| 4,629,664 | 12/1986 | Tsukui et al. | 429/15 |
| 4,772,481 | 9/1988 | Rohwer et al. | 426/335 |
| 5,599,638 | 2/1997 | Surampudi et al. | 429/33 |

*Primary Examiner*—Margaret Medley
*Attorney, Agent, or Firm*—Dale W. Dorinski

[57] ABSTRACT

A sulfuric acid-free fuel composition for use in liquid feed polymer electrolyte membrane fuel cells. The fuel composition is a solution of water, methanol and formic acid. The methanol is present in concentrations between 0.5 and 15 molar and the formic acid is present in concentrations between 0.01% and 20%. No corrosive mineral acids are present in the fuel.

7 Claims, 3 Drawing Sheets

FUEL FOR LIQUID FEED FUEL CELLS

TECHNICAL FIELD

The invention generally relates to fuel cells and in particular to fuel compositions for liquid feed organic fuel cells.

BACKGROUND

Fuel cells are electrochemical cells in which a free energy change resulting from a fuel oxidation reaction is converted into electrical energy. In an organic/air fuel cell, an organic fuel such as methanol, formaldehyde, or formic acid is oxidized to carbon dioxide at an anode, while air or oxygen is reduced to water at a cathode. Fuel cells employing organic fuels are extremely attractive for portable applications, in part, because of the high specific energy of the organic fuels, e.g., the specific energy of methanol is 6232 Wh/kg.

Direct oxidation fuel cells (as opposed to "indirect" or "reformer" fuel cells) feed the organic fuel directly into the fuel cell and the fuel is oxidized at the anode. Direct oxidation fuel cells use either a vapor or a liquid feed of the organic fuel. Current art direct oxidation fuel cells that show promise typically employ a liquid feed design in which a liquid organic fuel is circulated past the anode of the fuel cell. Liquid feed fuel cells oxidize a fuel such as methanol to produce electricity and chemical by-products including water and protons. In order for the fuel cell to operate properly, the coupled chemical and electrical paths occurring within the device must operate efficiently. Due to the porous nature of the anode, the reaction site for this electro-oxidation reaction is not necessarily juxtaposed to the electrode. As a result, the protons generated by the electro-oxidation reaction are not necessarily transported to the electrolyte and on to the cathode. Any inefficiency in proton transport within the anode will result in reduce electricity generation. One solution to this is to add a mineral acid such as sulfuric acid or phosphoric acid to the methanol fuel. While this alleviates the problem with ionic conduction within the anode, it limits the feasibility of this type of fuel cell by requiring special materials and special handling procedures to deal with the caustic chemical. The use of mineral acids in direct methanol fuel cells presents several problems. Sulfuric acid is highly corrosive and places significant constraints on the materials of construction of the fuel cell, with expensive corrosion resistant materials being required. Sulfate anions, created within the fuel cell, have a strong tendency to adsorb on the electrocatalyst, thereby hindering the kinetics of electro-oxidation of the fuel and resulting in poor performance of the fuel electrode. Also, sulfuric acid tends to degrade at temperatures greater than 80° C. and the products of degradation usually contain sulfur which can poison the electrocatalyst.

An exemplary solid polymer membrane fuel cell using methanol fuel is described in U.S. Pat. No. 5,599,638. U.S. Pat. Nos. 3,013,908 and 3,113,049 describe liquid feed methanol fuel cells using a sulfuric acid electrolyte, and U.S. Pat. Nos. 4,262,063, 4,390,603, 4,478,917 and 4,629,664 describe improvements to sulfuric acid-based methanol fuel cells wherein a high molecular weight electrolyte or a solid proton conducting membrane is interposed between the cathode and the anode as an ionically conducting layer to reduce crossover of the organic fuel from the anode to the cathode. Although the use of the ionically conducting layer helps reduce crossover, the ionically conducting layer is used only in conjunction with a sulfuric acid electrolyte. Hence, these fuel cells suffer from the various aforementioned disadvantages of using sulfuric acid as an electrolyte. In view of the problems associated with using sulfuric acid as an electrolyte, it would be desirable to provide a liquid feed fuel cell that does not require sulfuric acid. Additives such as perfluorooctanesulfonic acid, formaldehyde, trimethoxymethane, dimethoxymethane and trioxane have been proposed to provide improved oxidation rates for organic fuels, but each has a disadvantage.

In general, it is desirable to provide liquid fuels which undergo clean and efficient electrochemical oxidation within the fuel cell. The efficient utilization of organic fuels in direct oxidation fuel cells is, in general, governed by the ease by which the organic compounds are anodically oxidized within the fuel cell. Conventional organic fuels, such as methanol, present considerable difficulties with respect to electro-oxidation. In particular, the electro-oxidation of organic compounds such as methanol involves multiple electron transfer and is a very hindered process with several intermediate steps. These steps involve dissociative adsorption of the fuel molecule to form active surface species which undergo relatively easy oxidation. The ease of dissociative adsorption and surface reaction usually determines the facility of electro-oxidation. Many fuels poison the electrodes of the fuel cell during operation, thus preventing sustained trouble-free operation. Results from ultra high vacuum experiments suggests that the use of higher alcohols such as ethanol will produce $CO_2$, H+, electrons, and a surface methyl ($CH_3$) group. This surface methyl group can act as a poison to the electro-oxidation reaction. Likewise, an alcohol containing n carbon atoms (i.e., propanol (C3), butanol (C4), etc.) will release a hydrocarbon fragment to the surface that is n−1 carbon atoms in length. This hydrocarbon fragment can act as a poison for the electro-oxidation reaction by occupying surface reaction sites. As can be appreciated, it would be desirable to provide an improved methanol-type fuel which overcomes the disadvantages of the prior art.

DETAILED DESCRIPTION OF THE PREFERRED EMBODIMENT

Figure 1:
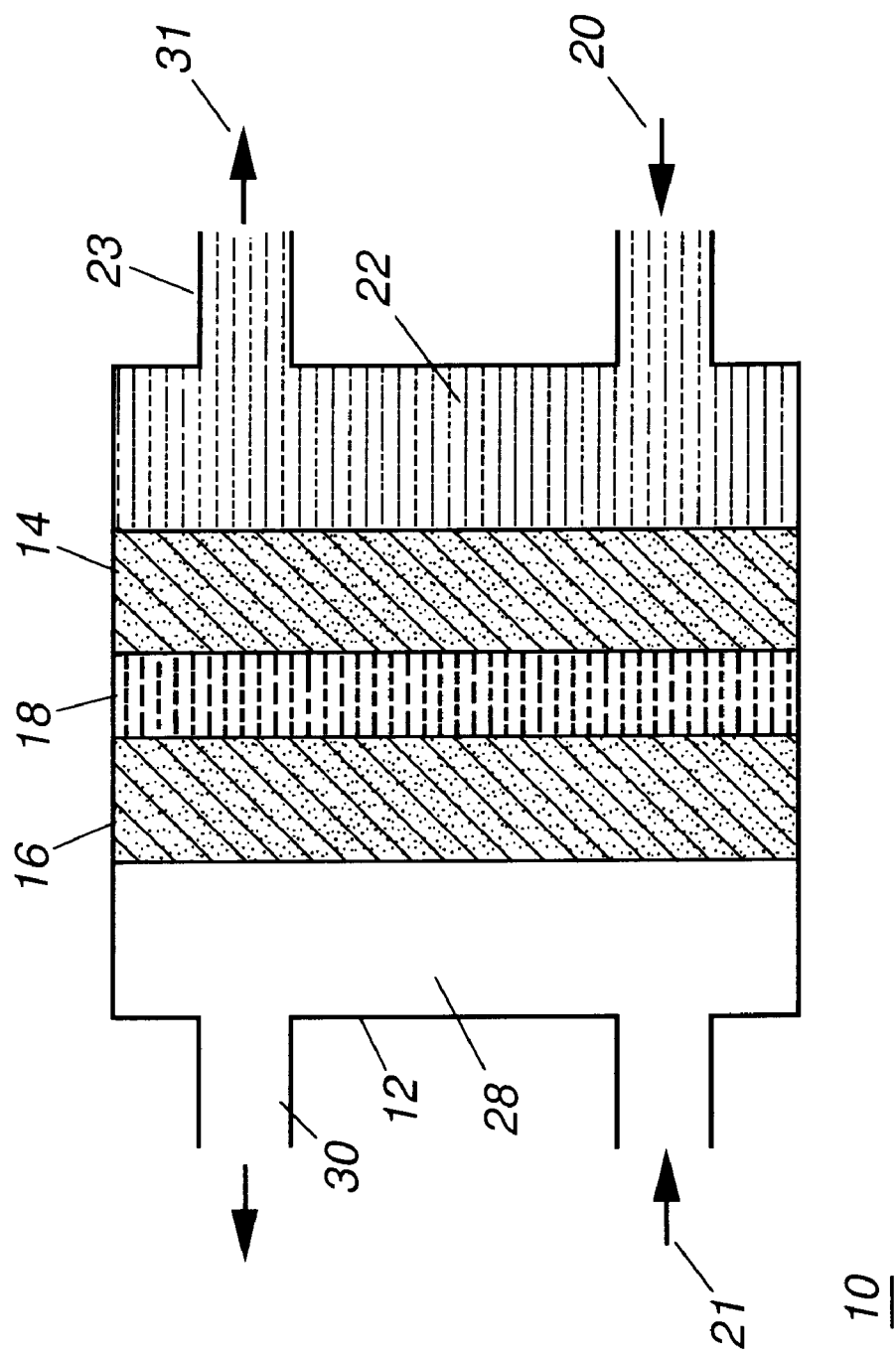
FIG. 1 provides a schematic representation of an improved liquid feed organic fuel cell having a solid polymeric membrane configured in accordance with the invention.

This invention consists of an organic fuel composition for a liquid feed fuel cell. The mixture consists of water as the base solvent, an alcohol such as methanol present in concentrations between 0.5 and 15 molar (with a preferred concentration of 1–4 molar), and a carboxylic acid such as formic acid present in concentrations between 0.01% and 20% by weight (with a preferred concentration of 0.01% to 5% by weight).

In the preferred embodiment of this invention, methanol is used as the alcohol in the fuel, and formic acid (HCOOH) is added to the fuel as a carboxylic acid additive. The formic acid serves as a mild acid electrolyte for the conduction of protons within the anode structure. Other alcohols such as ethanol, n-propanol or n-butanol may also be used singly, or in combination. In general, these type of alcohols have the structural formula of $C_aH_bOH$ where a is an integer between 1 and 4 and b is an integer between 1 and 9. Other carboxylic acids such as acetic acid, propanoic acid, etc. may also used alone, or in combination but not with equivalent efficiency. In general, these type of carboxylic acids have the structural formula $C_eH_f(COOH)$ eg where e is 1–3, f is 1–7, and g is 1–3. Low concentrations of halogenated alkyl carboxylic acids may be also substituted for the formic acid in the methanol acid fuel mixture to achieve the same effect. In general, these type of organic acids have a structural formula represented by $C_aH_bXO_2$ where a is 2–8, b is 3–17 and X represents a halogen. These acids include fluorine and chlorine containing derivatives of formic acid, acetic acid, etc. Halogenated carboxylic acids have a higher dissociation constant (pKa) than non-halogenated ones. This increase in dissociation constant results in a lower pH for the halogenated carboxylic acids and consequently increased ionic conduction. Perhalogenated carboxylic acids such as perfluoroacetic acid have the highest dissociation constants, resulting in high ionic conductivity. I prefer to use organic acids with dissociation constants of greater than $5\times10^{-5}$. Perhalogenated carboxylic acids, in low concentrations, should not result in significant poisoning of the catalyst surface since the major poisoning pathway (i.e., alkyl decomposition) is thermodynamically restricted. Although methanol-formic acid provides the best performance, these other organic acids can also be used, albeit with lesser efficiency. Studies in ultra high vacuum chambers have suggested that the decomposition of these other carboxylic acids on metal catalysts containing platinum results in the release of hydrocarbon fragments that are one carbon unit smaller than the parent carboxylic acid. Thus, acetic acid would release methyl groups to the surface and propanoic acid would release ethyl groups that may eventually poison the fuel electro-oxidation reaction by occupying valuable catalytic sites. However, this is not intended to limit the use of higher organic acids, and it is well within the spirit and scope of the invention to contemplate and claim these materials.

Conventional use of the term 'molar' for aqueous solutions means the number of moles of an ingredient per liter of the alcohol/water mixture. Likewise, conventional use of the term 'weight percent' means, for example, the number of grams of a particular ingredient per one hundred grams of the final composition. Thus, by accounting for the density difference between water and alcohol (typical density of 0.81 g/cc) and for the variances in molecular weight of the various alcohols, one can arrive at a final alcohol-carboxylic acid-water mixture that is expressed entirely in weight percent, if desired. The following tables describe some typical weight percentages of methanol and butanol that would be found in my ternary mixture.

| Weight % Alcohol in Ternary mixture | | |
|---|---|---|
| Moles | Carboxylic acid wt % | |
| methanol | 20% | 0.01% |
| 0.5 | 1.28 | 1.61 |
| 1 | 2.58 | 3.22 |
| 4 | 10.56 | 13.19 |
| 15 | 43.27 | 54.08 |
| Moles | Carboxylic acid wt % | |
| butanol | 20% | 0.01% |
| 0.5 | 2.99 | 3.73 |
| 1 | 6.02 | 7.53 |
| 4 | 25.45 | 31.81 |
| 15 | n/a | n/a |

As an additional embodiment of my invention, an aqueous solution containing a polymeric ionic conductor can be added to the methanol fuel to facilitate ionic conduction between the anode and the electrolyte. One example of such an aqueous polymeric ionic conductor is a 5% Nafion™ solution in water and alcohol. (Nafion™ is a copolymer of tetrafluoroethylene and perfluorovinylether sulfonic acid.) This Nafion™ solution can be an additive to the fuel in percentages ranging from 0.01% to 30% to improve the performance of the cell.

By adding a mild acid electrolyte such as formic acid, the electrode structure can be simplified, since ionic conduction within the anode is less of an issue. Formic acid is a clean burning fuel that does not poison the catalysts and I have found that it can be efficiently combined with methanol to provide a novel binary fuel for solid polymer electrolyte fuel cells.

Referring now to the drawing figures, a detailed description of how the fuel composition of the instant invention can be used in a fuel cell will now be described. In FIG. 1, a schematic representation of a polymer membrane electrolyte fuel cell used with the fuel composition of the invention, a liquid feed organic fuel cell 10 has a housing 12, an anode 14, a cathode 16 and a solid polymer proton-conducting cation-exchange electrolyte membrane 18. The anode 14, the cathode 16 and the solid polymer electrolyte membrane 18 are preferably a single multi-layer composite structure, referred to herein as a membrane-electrode assembly. A methanol-formic acid fuel solution 20 is introduced into an anode chamber 22 of housing 12. The fuel/water/carbon dioxide byproduct mixture 31 is withdrawn through an outlet port 23. Oxygen or air 21 is fed into a cathode chamber 28 within housing 12.

Prior to use, the anode chamber 22 is filled with the methanol-formic acid fuel solution 20 and the cathode chamber 28 is filled with air or oxygen 21. During operation, the fuel solution circulates past the anode while oxygen or air circulates past the cathode. When an electrical load (not shown) is connected between the anode 14 and the cathode 16, electro-oxidation of the fuel solution occurs at the anode and electro-reduction of oxygen occurs at the cathode. The occurrence of different reactions at the anode and cathode gives rise to a voltage difference between the two electrodes. Electrons generated by electro-oxidation at the anode 14 are conducted through the external load (not shown) and are ultimately captured at the cathode 16. Hydrogen ions or protons generated at the anode are transported directly across the membrane electrolyte to the cathode. Thus, a flow of current is sustained by a flow of ions through the cell and electrons through the external load.

The anode 14, the cathode 16 and the membrane 18 form a single composite layered structure. The membrane should have a low permeability to the liquid fuel. In one implementation, the membrane 18 is formed from Nafion™, a perfluorinated proton-exchange membrane material. Although Nafion™ membranes are effective as a proton-conducting solid polymer electrolyte membrane, other membrane materials can also be used, for example, membranes of modified perflourinated sulfonic acid polymer such as Aciplex™ (manufactured by Asahi Glass Co., Japan) and polymer membranes made by Dow Chemical Co., USA, such as XUS13204.10 which are similar in properties to Nafion™ are also applicable. Membranes of polyethylene and polypropylene sulfonic acid, polystyrene sulfonic acid, other polyhydrocarbon-based sulfonic acids and composites of two or more kinds of proton exchange membranes can also be used depending on the temperature and duration of fuel cell operation.

The anode 14 is typically formed from platinum-ruthenium alloy particles either as fine metal powders, i.e. "unsupported", or dispersed on high surface area carbon, i.e. "supported". The high surface area carbon may be a material such as Vulcan XC-72A, provided by Cabot Inc., USA. A carbon fiber sheet backing (not shown) can be used to make electrical contact with the particles of the electrocatalyst.

The cathode 16 is a gas diffusion electrode in which platinum particles are bonded to one side of the membrane 18. Unsupported platinum black (fuel cell grade) available from Johnson Matthey Inc., USA or supported platinum materials available from E-Tek Inc., USA are suitable for the cathode. As with the anode, the cathode metal particles are preferably mounted on a carbon backing material. The loading of the electrocatalyst particles onto the carbon backing is preferably in the range of 0.5–4.0 mg/cm². The electrocatalyst alloy and the carbon fiber backing contain 10–50 weight percent Teflon™ to provide hydrophobicity needed to create a three-phase boundary and to achieve efficient removal of water produced by electro-reduction of oxygen.

Preferably the oxidant (oxygen or air) is circulated past the cathode 16 at pressures in the range of 10 to 30 psi. Pressures greater than ambient improve the mass transport of oxygen to the sites of electrochemical reactions, especially at high current densities. Water produced by electrochemical reaction at the cathode is transported out of the cathode chamber 28 by the flow of oxygen through the port 30.

Figure 2:
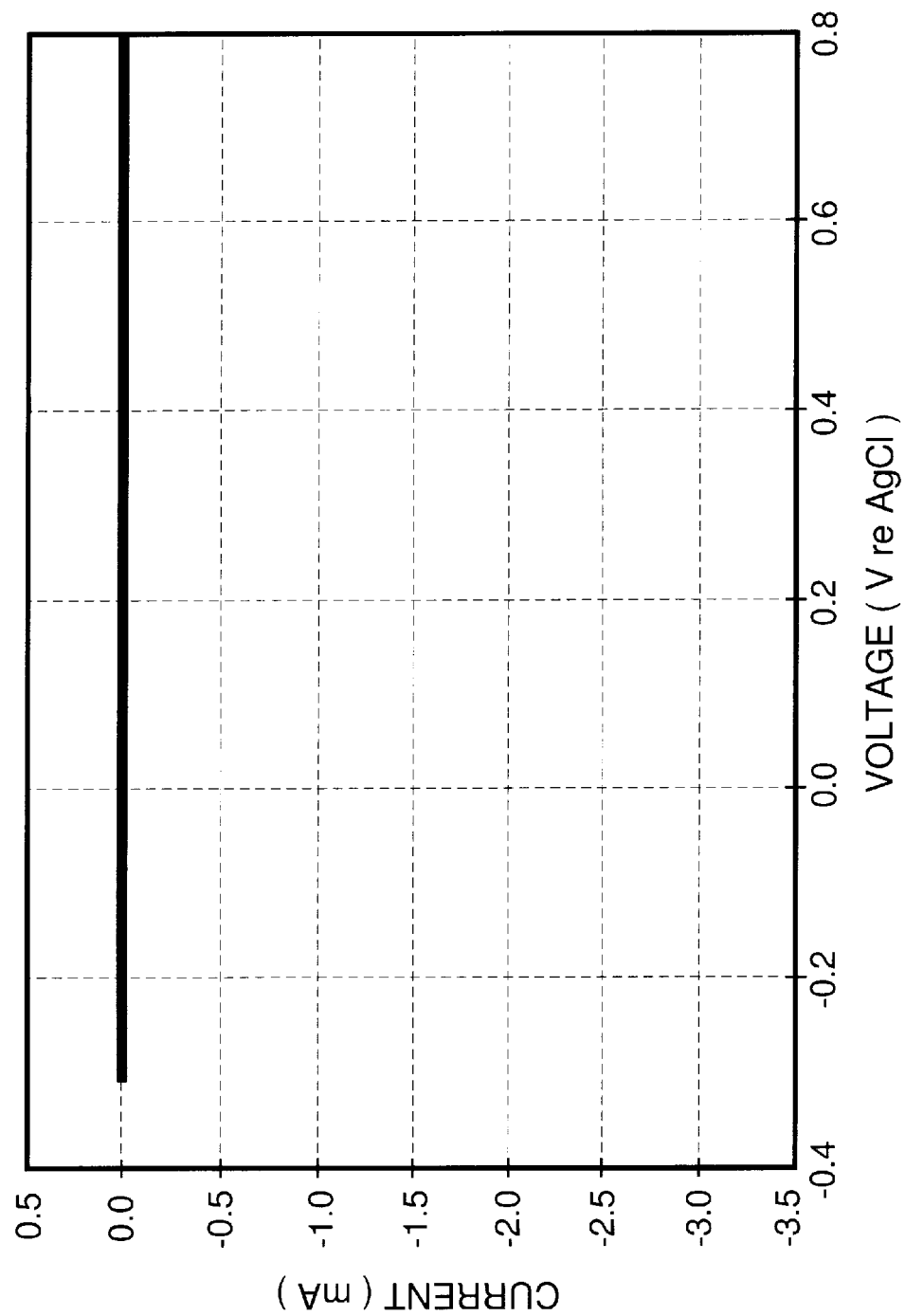
FIG. 2 is a cyclic voltammogram of the performance of a prior art pure methanol/water fuel.
Figure 3:
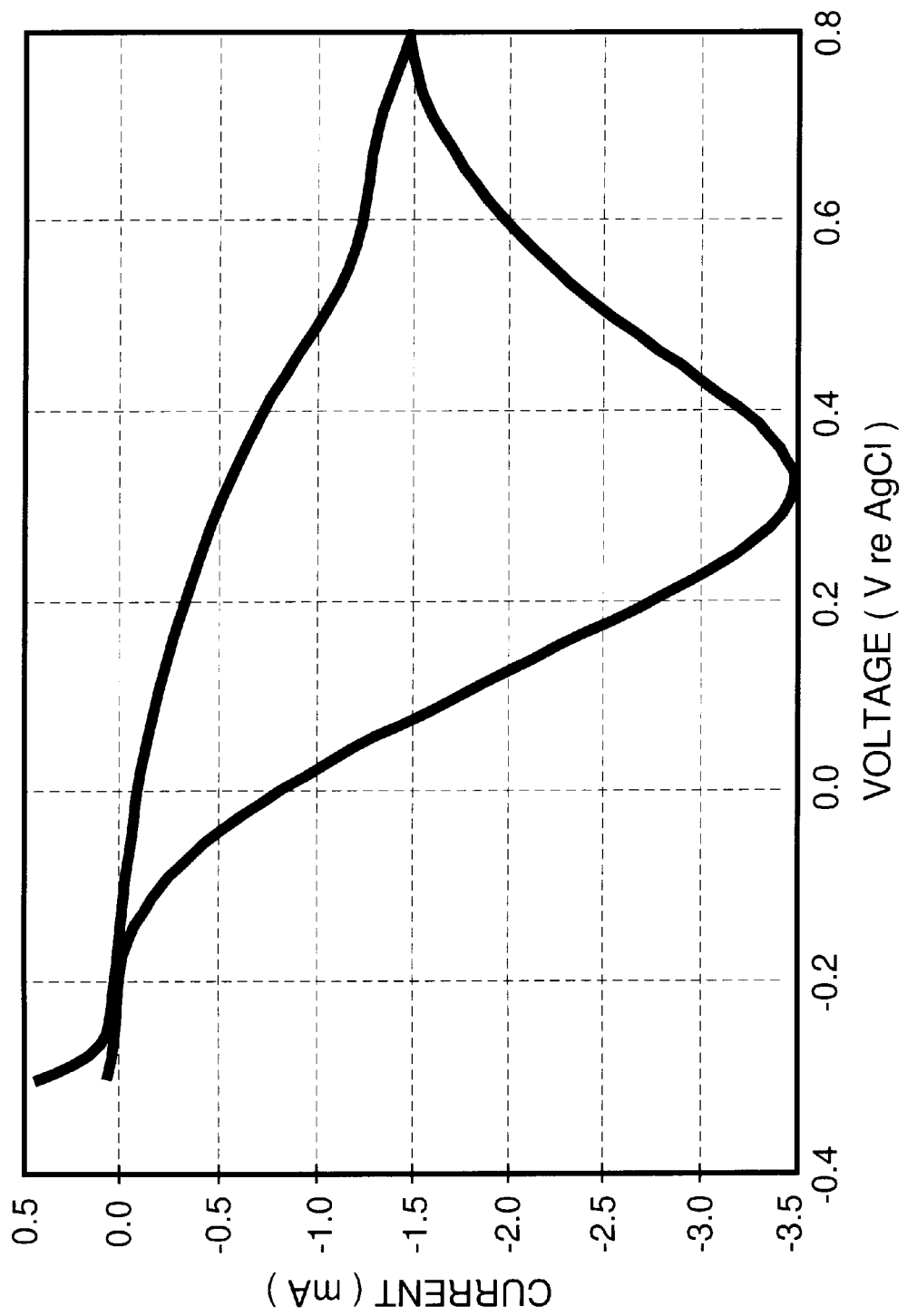
FIG. 3 is a cyclic voltammogram of a methanol-formic acid fuel solution in accordance with the invention.

FIG. 2 is a cyclic voltammetric profile demonstrating the performance of methanol oxidation in a pure methanol/water solution as practiced in the prior art. The ionic conductivity is low, resulting in a cyclic voltammetric profile that essentially mirrors a resistor, due to the high cell impedance. In contrast, FIG. 3 shows the improvement in methanol oxidation upon the addition of formic acid. Ionic conductivity is greatly improved and methanol oxidation clearly occurs as demonstrated by the large increase in current.

In summary, it can be appreciated from the foregoing description that a methanol-formic acid fuel solution provides unique benefits to solid polymer membrane fuel cells, without the need for corrosive electrolyte additives or expensive electrode modifiers. No mineral acid is present in the liquid fuel and water mixture, and as such, acid-induced corrosion of cell components, which can occur in current-art acid based organic/air fuel cells, is avoided. This offers considerable flexibility in the choice of materials for the fuel cell and the associated subsystems. Furthermore, unlike fuel cells which contain potassium hydroxide as liquid electrolyte, cell performance does not degrade because soluble carbonates are not formed. A methanol-formic acid fuel solution for direct methanol fuel cells eliminates the need for corrosive acids and simplifies the anode manufacturing process.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A fuel composition for fuel cells, consisting of a solution of water, one or more alcohols of the formula $C_aH_bOH$ where a is an integer between 1 and 4 and b is an integer between 1 and 9, and one or more carboxylic acids of the formula $C_eH_f(COOH)_g$ where e is 1–3, f is 1–7, and g is 1–3; and wherein the alcohol is present in concentrations between 1.28% and 54.08% by weight and the carboxylic acid is present in concentrations between 0.01% and 20% by weight.

2. A fuel composition for fuel cells, consisting of a solution of water, one or more alcohols selected from the group consisting of methanol, ethanol, n-propanol and n-butanol, and one or more carboxylic acids selected from the group consisting of formic acid, acetic acid, propanoic acid, butanoic acid and halogenated alkyl carboxylic acids; and wherein the alcohol is present in concentrations between 1.28% and 54.08% by weight and the carboxylic acid is present in concentrations between 0.01% and 20% by weight.

3. The fuel composition of claim 2, wherein the halogenated alkyl carboxylic acid is $C_aH_bXO_2$ where a is 2–8, b is 3–17 and X represents a halogen.

4. A fuel composition for fuel cells, consisting of a solution of water, methanol in an amount between 2.58% and 10.56% by weight, and formic acid in an amount between 0.01% and 5% by weight.

5. A fuel composition for fuel cells, consisting of a solution of water, methanol and formic acid, wherein the methanol is present in concentrations between 1.28% and 54.08% by weight and the formic acid is present in concentrations between 0.01% and 20% by weight.

6. The fuel composition of claim 5, wherein the formic acid is between 0.01% and 5% by weight.

7. The fuel composition of claim 5, wherein the methanol is between 2.58% and 13.19% by weight.

* * * * *